United States Patent [19]

Christiansen et al.

[11] 4,366,116
[45] Dec. 28, 1982

[54] NUCLEAR REACTOR FUEL ASSEMBLY DUCT-TUBE-TO-HANDLING-SOCKET ATTACHMENT SYSTEM

[75] Inventors: David W. Christiansen; Bob G. Smith, both of Kennewick, Wash.

[73] Assignee: The United States of America as represented by the United States Department of Energy, Washington, D.C.

[21] Appl. No.: 240,676

[22] Filed: Mar. 5, 1981

[51] Int. Cl.³ .............................................. G21C 3/06
[52] U.S. Cl. .................................................. 376/446
[58] Field of Search .............. 376/361, 362, 364, 365, 376/446

[56] References Cited

U.S. PATENT DOCUMENTS

| 3,194,740 | 7/1965 | Frisch ............................... 376/446 |
| 3,377,254 | 4/1968 | Frisch ............................... 376/446 |
| 3,802,996 | 4/1974 | Jones . |
| 3,856,621 | 11/1974 | Suvanto et al. . |
| 3,968,008 | 7/1976 | Piepers et al. . |
| 4,030,975 | 6/1977 | Anthony et al. . |

FOREIGN PATENT DOCUMENTS 30396 3/1979 Japan ................................... 376/446

*Primary Examiner*—Harvey E. Behrend
*Attorney, Agent, or Firm*—Douglas E. Erickson; Richard E. Constant; Richard G. Besha

[57] ABSTRACT

A reusable system for removably attaching the upper end 10 of a nuclear reactor duct tube to the lower end 30 of a nuclear reactor fuel assembly handling socket. A transition ring 20, fixed to the duct tube's upper end 10, has an interior-threaded section 22 with a first locking hole segment 24. An adaptor ring 40, fixed to the handling socket's lower end 30 has an outside-threaded section 42 with a second locking hole segment 44. The inside 22 and outside 42 threaded sections match and can be joined so that the first 24 and second 44 locking hole segments can be aligned to form a locking hole. A locking ring 50, with a locking pin 52, slides over the adaptor ring 40 so that the locking pin 52 fits in the locking hole. A swage lock 60 or a cantilever finger lock 70 is formed from the locking cup collar 26 to fit in a matching groove 54 or 56 in the locking ring 50 to prevent the locking ring's locking pin 52 from backing out of the locking hole.

8 Claims, 8 Drawing Figures

NUCLEAR REACTOR FUEL ASSEMBLY DUCT-TUBE-TO-HANDLING-SOCKET ATTACHMENT SYSTEM

BACKGROUND OF THE INVENTION

The present invention relates generally to nuclear reactor fuel assemblies and more particularly to a reusable system for removably attaching a nuclear reactor fuel assembly duct tube to a nuclear reactor fuel assembly handling socket. The United States Government has rights in this invention pursuant to contract number EY-76-C-14-2170 between the U.S. Department of Energy and the Westinghouse Hanford Company.

To produce power from the nuclear reactor, it is necessary to assemble a concentration of fissionable uranium, thorium, and/or plutonium in a quantity and in a physical configuration capable of sustaining a continuous sequence of fission reactions. This concentration is frequently referred to as a reactor core. The heat that the fission reactions generate is transferred to a fluid such as, for example, liquid sodium. The sodium, in turn, transfers its heat to a secondary coolant, or ultimate coolant, which can be used to drive turbines which power electrical generation equipment.

Because the radiation, pressure, temperature, flow velocity, and other environmental conditions within the reactor core are quite hostile, the reactor core must be of sturdy construction. These conditions produce a number of phenomena with which it is very difficult to cope. Thus, for example, thermal, pressure, and irradiation effects tend to produce considerable creep in materials which can expand dimensions, cause bow and other effects which shorten fuel assembly life. Also, due to fabrication constraints and to varying material requirements throughout a reactor core, it is often difficult to achieve ideal fuel behavior. These effects have been known to produce a type of deterioration in that dimensional constraints of a fuel assembly in a reactor core can no longer be met over a period of time.

In building a reactor core, usually pellets of uranium or plutonium dioxide are loaded into long slender tubes called fuel rods. With the tubes loaded with pellets and the ends of each tube sealed, these fuel rods are arranged longitudinally parallel with each other and are arranged in generally hexagonal arrays of about 200 fuel rods. Each array is called a fuel assembly. These fuel assemblies all are mounted side-by-side in a larger, generally right circular cylindrical configuration that characterizes the reactor core.

Each fuel assembly often includes an upper handling socket and a lower nozzle which are both attached to a duct tube containing the fuel rods. The fuel rods receive radial support from the duct tube and longitudinal support from the lower nozzle. Each fuel assembly may be loaded into, and removed from, the reactor core by a handling machine which acts as a hoist having a grappling device which can be attached to the fuel assembly's upper handling socket. Coolant usually flows in through the lower or inlet nozzle of the fuel assembly, up through the spaces between fuel rods and out through the upper handling socket of the fuel assembly.

Often, duct material incompatibility with the environment or a leaky fuel rod can degrade the operating life expectancy of the fuel assembly. This gives a need, with a significant cost incentive, for being able to remove duct tubes from their handling sockets for various reasons such as fuel assembly internal inspection, testing and maintenance or even individual fuel rod replacement, without the destruction of the duct tube and/or handling socket.

The prior art attaches the duct tube to the handling socket by welding, and uses destructive techniques to separate them.

SUMMARY OF THE INVENTION

It is an object of the invention to quickly and inexpensively attach a nuclear reactor fuel assembly duct tube to a nuclear reactor fuel assembly handling socket.

It is another object of the invention to quickly, inexpensively, and nondestructively remove an attached nuclear reactor fuel assembly duct tube from a nuclear reactor fuel assembly handling socket.

It is a further object of the invention to allow repeated attachment and removal of a nuclear reactor fuel assembly duct tube and a nuclear reactor fuel assembly handling socket.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the nuclear reactor fuel assembly duct tube and handling socket attachment and removal system may comprise a nuclear reactor fuel assembly handling socket, a nuclear reactor fuel assembly duct tube, a transition ring, an adaptor ring, a locking ring, and a reuseable fastening device. The duct tube's upper end and the transition ring are coaxially joined, as are the handling socket's lower end and the adaptor ring. The transition ring has a lower portion and an upper portion. The lower portion has inside threads with a first locking hole segment. The upper portion has a locking cup collar which is transversely wider than the inside threads. The transition ring also has a transversely-disposed surface which extends from the locking cup collar to the inside threads. The adaptor ring has lower outside threads with a second locking hole segment. The inside and outside threads match to connect the transition and adaptor rings with the first and second locking hole segments matching to form a locking hole. The locking ring, having a locking pin, surrounds the adaptor ring and is narrower than the locking cup collar so that the locking ring can be axially moved, by hand or appropriately designed tool, to insert the locking pin in the locking hole. The reuseable fastening device, such as a swage lock or cantilever finger lock, secures the locking cup collar to the locking ring when the duct tube and handling socket are attached. For detachment, a simple prying tool can be fastened to disengage the swage lock or cantilever finger lock, allowing for later reuse.

Several benefits and advantages are derived from the invention. The invention's rapid attachment and removal feature allows easy removal of a nuclear reactor fuel assembly duct tube from its handling socket for inspection, testing, maintenance and the like. The invention's reusability feature allows the removed duct tube and/or handling socket to be reconnected or replaced with a different one. This is to be contrasted with the prior art which provides for a destructive, one-time removal system. The invention's reusability feature and rapid attachment and removal feature provide an economic benefit for test and/or commercial reactors. For example, various duct tube material configurations can be tested without degrading fuel assembly life and the limited life of assemblies could be extended.

BRIEF DESCRIPTION OF THE DRAWINGS

The accompanying drawings which are incorporated in and form a part of this specification, illustrate an embodiment of the present invention and, together with a description, serve to explain the principles of the invention. In the drawing.

DETAILED DESCRIPTION OF THE INVENTION

Reference will now be made in detail to the present preferred embodiment of the invention, an example of which is illustrated in the accompanying drawings.

Figure 1:
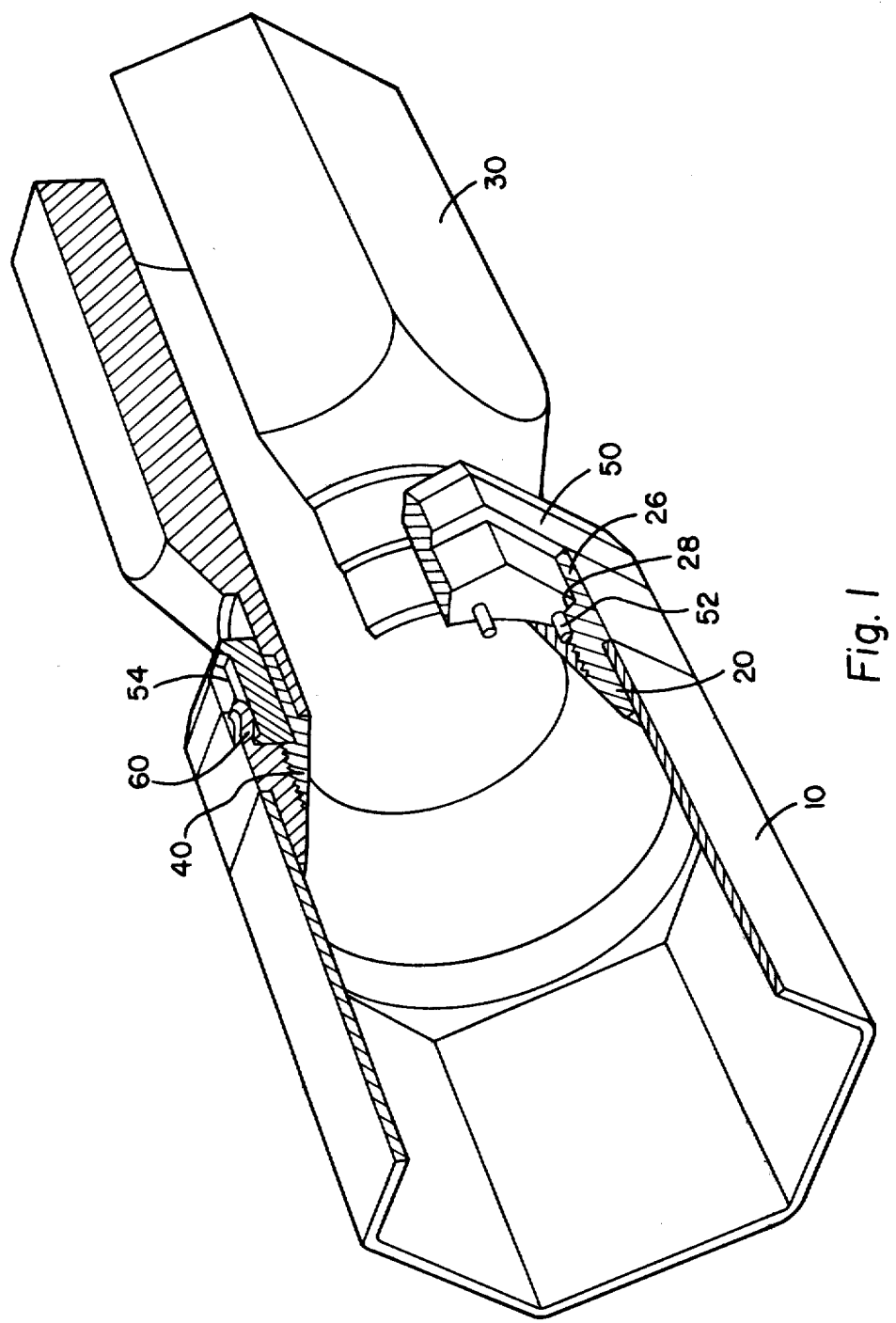
FIG. 1 is a three-dimensional cutaway view of the upper end of a duct tube and the lower end of a handling socket, showing their attachment.

The overall arrangement for attaching the duct tube to the handling socket is shown in FIG. 1. A transition ring 20 is affixed to the duct tube's upper end 10, and an adaptor ring 40 is affixed to the handling socket's lower end 30. The transition ring 20 and the adaptor ring 40 screw together creating locking holes. A locking ring 50 has locking pins 52 which match the locking holes to prevent uncoupling. A reuseable fastening device, such as a swage lock 60 secures the transition ring 20 to the locking ring 50 to prevent locking ring 50 backoff.

Figure 2:
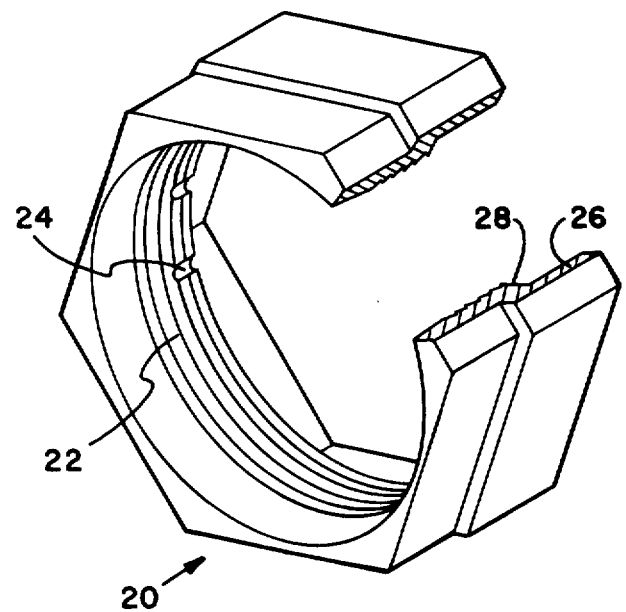
FIG. 2 is an enlarged, partial sectional view of the transition ring.

The annular transition ring 20, as shown in FIGS. 1 and 2 is coaxially secured to the nuclear reactor fuel assembly duct tube's upper end 10. This would usually be done by welding. Preferably, the transition ring 20 is hermetically sealed to the duct tube's upper end 10, and the duct tube preferably has a generally polygonal, usually hexagonal, shape.

The transition ring 20 has a longitudinal axis and has a lower portion connected to an upper portion. The lower portion has an inside-threaded section 22 which is coaxially aligned with the longitudinal axis. The inside-threaded section 22 has a top region which contains at lease one first locking hole segment 24. This segment is longitudinally disposed. The upper portion of the transition ring has a locking cup collar 26 which is coaxially aligned with the longitudinal axis, and annularly shaped. The locking cup collar 26 is transversely wider than the inside-threaded section 22. Preferably the locking cup collar has a generally polygonal, usually hexagonal, shape. Thus, although the inside threaded section 22 would be generally cylindrical in shape, the locking cup collar 26 would preferably be hexagonal in shape, but of wider dimension. A locking cup bottom surface 28 extends from the locking cup collar 26 to the inside threaded section 22. The locking cup bottom surface 28 is annular in shape and disposed generally transversely (perpendicular to the longitudinal axis).

Figure 3:
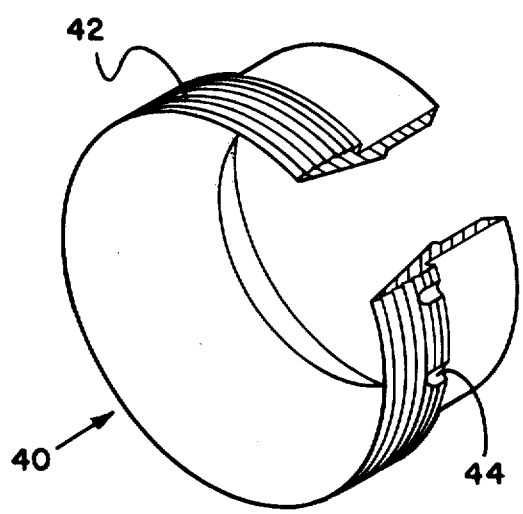
FIG. 3 is an enlarged, partial sectional view of the adaptor ring.

The annular adaptor ring 40, as shown in FIGS. 1 and 3, is coaxially secured to the nuclear reactor fuel assembly handling socket's lower end 30. Usually, the attachment would be made by welding. Preferably, the adaptor ring 40 is hermetically sealed to the handling socket's lower end 30, and preferably the handling socket has a general polygonal, usually hexagonal, shape.

The adaptor ring 40 has a longitudinal axis and has a lower portion containing an outside-threaded section 42 which is coaxially aligned with the longitudinal axis. The outside-threaded section 42 also has a bottom region which contains a corresponding second locking hole segment 44 for each first locking hole segment 24 in the transition ring 20. The second locking hole segment 44 is longitudinally disposed. The transition ring's inside threaded section 22 and the adaptor ring's outside threaded section 42 have matching threads so that the transition ring 20 and the adaptor ring 40 can be screwed together such that the transition ring inside threaded section first locking hole segment 24 can be aligned with the adaptor ring outside threaded section second locking hole segment 44 to form one or more locking holes. Preferably the transition ring and the adaptor ring each contain a plurality of locking hole segments which form a plurality of locking holes when the transition ring and the adaptor ring are screwed together.

Figure 4:
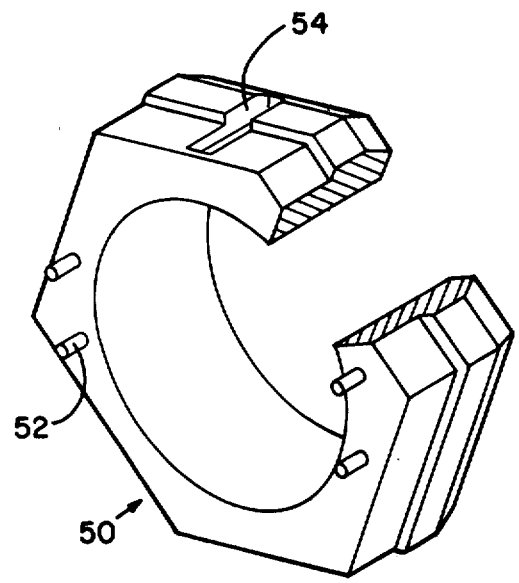
FIG. 4 is an enlarged, partial sectional view of the locking ring.

The annular locking ring 50, as shown in FIGS. 1 and 4, is coaxially aligned with, and surrounds, the adaptor ring 40. Although wider than the adaptor ring 40, the locking ring 50 is transversely narrower than, and preferably its exterior matches the shape of, the locking cup collar 26. The lower portion of the locking ring 50 has a locking pin 52 which is longitudinally disposed and which can be mated with the locking hole. When there is a plurality of locking holes, there preferably is a matching plurality of locking pins to mate with the locking holes. Also, when the locking pin 52 is engaged in the locking hole, preferably the locking ring 50 annularly contacts the locking cup bottom surface 28. The locking ring 50 has sufficient freedom of longitudinal movement to permit the locking pin 52 to engage and disengage with the locking hole. It should be noted that in the embodiment of the invention depicted in FIG. 1, the longitudinal movement of the locking ring 50 is limited by the raised outside-threaded section 42 of the adaptor ring 40, and by the widening shoulder area of the handling socket's lower end 30. This requires that the locking ring 50 be placed to surround the adaptor ring 40 before the adaptor ring 40 is welded to the handling socket's lower end 30.

Figure 5A:
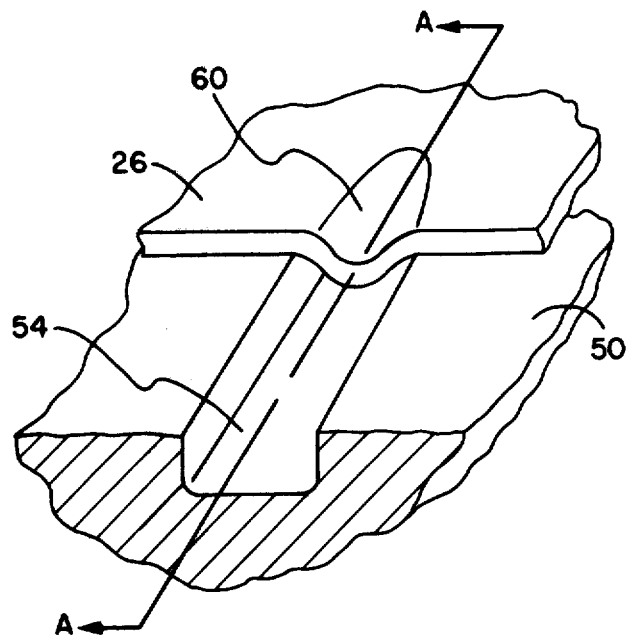
FIG. 5(a) is a perspective view, and FIG. 5(b) a cross sectional view, of the swage lock means for preventing backoff of the locking ring.
Figure 5B:
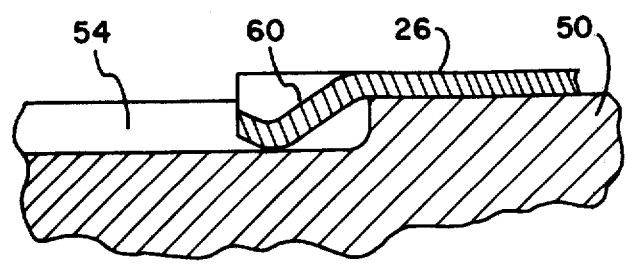
Figure 6A:
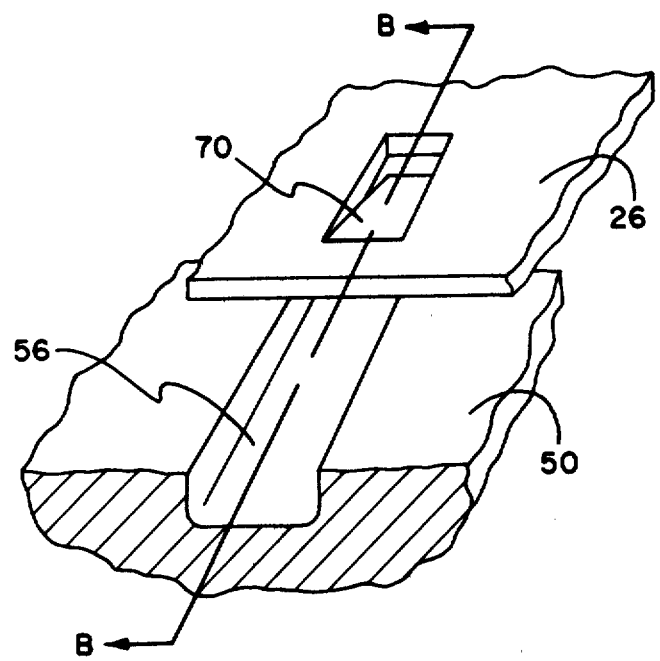
FIG. 6(a) is a perspective view, and FIG. 6(b) a cross sectional view of the cantilever finger lock means of preventing backoff of the locking ring.
Figure 6B:
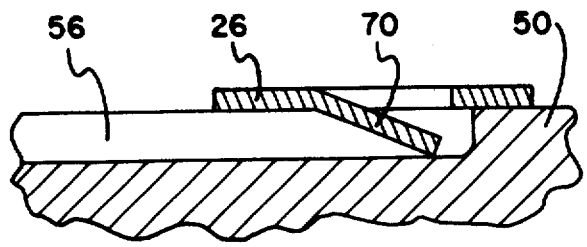

A reuseable fastening device serves as a means for securing the locking cup collar 26 to the locking ring 50, preventing the locking pin 52 from backing out of the locking hole. Preferably, such means would include a swage lock 60 as shown in FIGS. 1, 5(a) and 5(b). Such means could also include a cantilever finger lock 70 as shown in FIGS. 6(a) and 6(b). The swage lock 60 is formed from the locking cup collar 26 and is longitudinally disposed. It engages a matching, longitudinally disposed, locking groove 54 (see also FIGS. 1 and 4) formed in the locking ring 50.

When a cantilever finger lock 70 is used as the securing means, the cantilever finger lock 70 is formed from the locking cup collar 26 and is longitudinally aligned. It engages a matching, longitudinally aligned, locking groove 56 formed in the locking ring 50.

Both the swage lock 60 and the cantilever finger lock 70 are known in the prior art.

To attach the nuclear reactor fuel assembly duct tube to the nuclear reactor fuel assembly handling socket, the transition ring 20, which is attached to the duct tube's upper end 10, and the adaptor ring 40, which is attached to the handling socket's lower end 30, are screwed together and the locking hole segments are matched up to form a locking hole. The locking ring 50 is then longitudinally moved downwards and rotated to match the alignment of the locking hole and the locking cup collar 26. A swage lock 60 or a cantilever finger lock 70 is then formed to secure the locking cup collar 26 to the locking ring 50. To form the swage lock 60, a simple hammer-type tool crimps a part of the locking cup collar 26 into the locking groove 54 in the locking ring 50. Unlocking is accomplished by using a simple prying tool to uncrimp the swage lock 60 to the extent necessary to remove the locking ring. To form the cantilever finger lock 70, a simple punch type tool would stamp out the cantilever finger lock 70, and another simple prying tool would be used to raise the finger to the extent necessary for locking ring removal. The formed swage lock 60 or cantilever finger lock 70 could be reused, or additional locking grooves (54 or 56) could be employed so that new swage locks or cantilever finger locks could be formed each time the attachment system is used.

In summary, by using a transition ring 20, an adaptor ring 40, and a locking ring 50, a duct tube can be removably attached to a handling socket in a reusable system by screwed attachment plus locking holes and pins, together with a reuseable means to secure the locking pin, such as a swage lock or cantilever finger lock. This provides a reusable, economical, and rapid attachment and removal system for nuclear reactor fuel assembly duct tubes and handling sockets.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A reusable nuclear reactor fuel assembly duct-tube-to-handling-socket attachment system, comprising:
   (a) a nuclear reactor fuel assembly duct tube having an upper end;
   (b) an annular transition ring coaxially fixed to said duct tube's upper end, with:
      (i) a lower portion having a coaxially aligned inside-threaded section having a top region containing a longitudinally-disposed, first locking hole segment,
      (ii) an upper portion having a longitudinally-disposed, annular, locking cup collar transversely wider than said inside-threaded section, and
      (iii) an annular locking cup bottom surface, disposed generally transversely, which extends from said locking cup collar to said inside-threaded section;
   (c) a nuclear reactor fuel assembly handling socket having a lower end;
   (d) an annular adaptor ring coaxially fixed to said handling socket's lower end, with a lower portion having a coaxially aligned outside-threaded section having a bottom region containing a longitudinally-disposed, second locking hole segment, said outside-threaded section engagable with said transition ring's inside-threaded section, with said second locking hole segment alignable with said transition ring's first locking hole segment to define a locking hole;
   (e) an annular locking ring, transversely narrower than said locking cup collar, coaxially surrounding said adaptor ring, with a lower portion having a longitudinally-disposed locking pin matable with said locking hole, said locking ring longitudinally slidable, with said locking pin engagable and disengagable with said locking hole; and
   (f) means for securing said locking cup collar to said locking ring when said locking pin is engaged in said locking hole.

2. The system of claim 1, wherein said locking ring annularly engages said locking cup bottom surface when said locking pin is engaged in said locking hole.

3. The system of claim 2, also including at least one additional said locking pin with matching said locking hole.

4. The system of claim 3, wherein said transition ring is hermetically sealed to said duct tube's upper end, and said adaptor ring is hermetically sealed to said handling socket's lower end.

5. The system of claim 4, wherein said duct tube and said handling socket both are generally hexagonally shaped.

6. The system of claim 5, wherein said locking cup collar and the exterior of said locking ring both are generally hexagonally shaped.

7. The system of claim 6, wherein said securing means comprises a swage lock longitudinally-disposed in said locking cup collar and a region in said locking ring containing a longitudinally-disposed, swage lock matching, locking groove.

8. The system of claim 6, wherein said securing means comprises a cantilever finger lock longitudinally-disposed in said locking cup collar and a region in said locking ring containing a longitudinally-disposed, cantilever finger lock matching, locking groove.

* * * * *